United States Patent
Hedé

(10) Patent No.: US 12,281,688 B2
(45) Date of Patent: Apr. 22, 2025

(54) ROPE WITH RADIAL SEAM AND METHOD FOR MANUFACTURING

(71) Applicant: ZEDEL, Crolles (FR)

(72) Inventor: Jean-Marc Hedé, Domène (FR)

(73) Assignee: ZEDEL, Crolles (FR)

( * ) Notice: Subject to any disclaimer, the term of this patent is extended or adjusted under 35 U.S.C. 154(b) by 334 days.

(21) Appl. No.: 17/870,237

(22) Filed: Jul. 21, 2022

(65) Prior Publication Data

US 2023/0048525 A1 Feb. 16, 2023

(30) Foreign Application Priority Data

Aug. 16, 2021 (FR) ...................................... 2108716

(51) Int. Cl.
*D07B 1/16* (2006.01)
*D07B 9/00* (2006.01)
*F16G 11/00* (2006.01)

(52) U.S. Cl.
CPC ............... *F16G 11/00* (2013.01); *D07B 1/16* (2013.01); *D07B 9/00* (2013.01); *D07B 2401/20* (2013.01); *D07B 2501/2038* (2013.01)

(58) Field of Classification Search
CPC ........................................................ D07B 1/16
See application file for complete search history.

(56) References Cited

U.S. PATENT DOCUMENTS

| 5,205,803 A | 4/1993 | Zemitis |
| 5,836,357 A * | 11/1998 | Kittson ............... F16L 55/1656 428/36.2 |
| 6,036,066 A * | 3/2000 | Giacona, III ............. A45F 5/02 24/3.13 |
| 6,691,497 B1 * | 2/2004 | Rodgers .................... B68B 1/04 54/6.1 |
| 2005/0092789 A1 * | 5/2005 | Giacona, III ............. A45F 3/14 224/257 |
| 2013/0157823 A1 * | 6/2013 | Gilman .............. A63B 21/4043 482/139 |
| 2015/0121833 A1 * | 5/2015 | Vandrovcova ......... D07B 1/185 57/202 |

FOREIGN PATENT DOCUMENTS

| EP | 2 186 551 A1 | 5/2010 |
| FR | 3 061 211 A1 | 6/2018 |

* cited by examiner

*Primary Examiner* — Andrew T Piziali
(74) *Attorney, Agent, or Firm* — Oliff PLC

(57) ABSTRACT

A rope comprises a core extending along a longitudinal axis and a sheath surrounding the core, the sheath extending along the longitudinal axis. A strap at least partially surrounds the sheath, the strap being separated from the core by the sheath. At least one thread passes several times through the strap, sheath and core to form several links fixedly securing the strap on the core and sheath. The links pass through a central section of the core, the central section corresponding to a circular section representing less than 50% of the cross-section of the core. The links are angularly offset from one another when observed along the longitudinal axis.

10 Claims, 2 Drawing Sheets

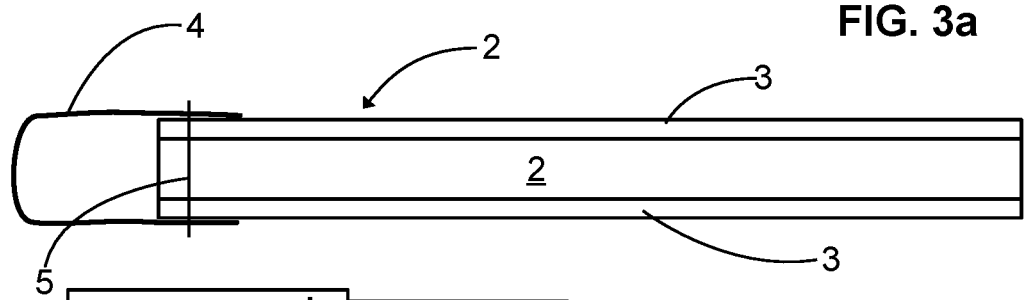
FIG. 3a
FIG. 3b
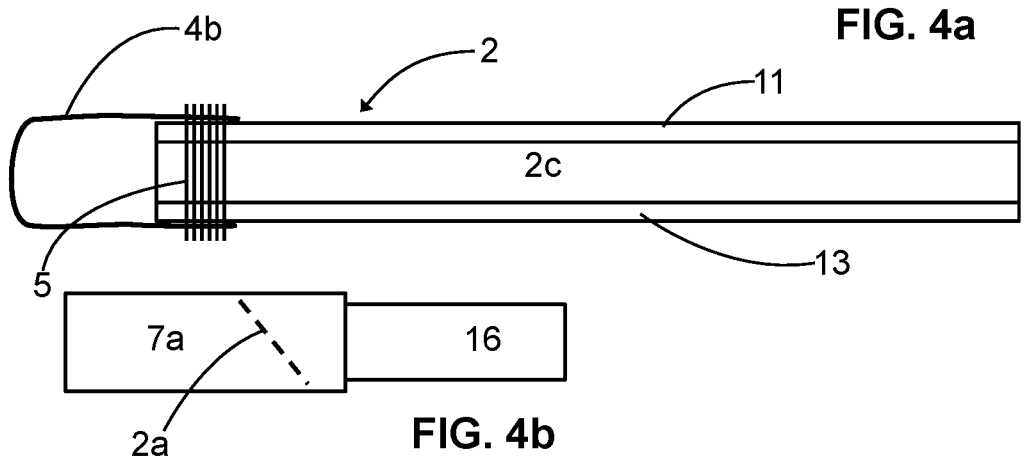
FIG. 4a
FIG. 4b
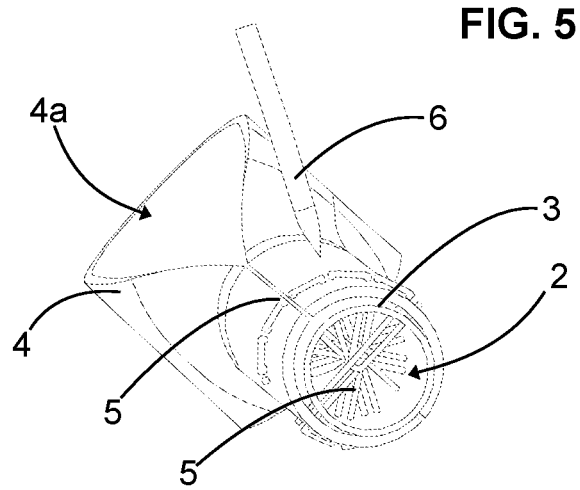
FIG. 5

ROPE WITH RADIAL SEAM AND METHOD FOR MANUFACTURING

BACKGROUND OF THE INVENTION

The invention relates to a rope and to a method for manufacturing a rope.

STATE OF THE ART

In a large number of activities such as mountaineering, rock climbing and working at height, it is conventional practice to form a loop at one end of a rope to insert a connector or an anchor point therein.

It is known to make a knot at the end of the rope in order to define the loop. This approach is however hardly recommendable as it is greatly dependent on the person making the knot. It is also known to fold the end of the rope so as to define a loop. The two rope folds are stitched to one another. Mastery of the stitching process enables the strength of the loop to be mastered which makes for a rope termination with better industrial monitoring. However it must be recognised that this technical solution results in the volume at the end of the rope being doubled. Such a volume may be particularly inconvenient when the rope is used in confined spaces, in particular in the field of tree care.

It is also known to modify the end of the rope so as to make a splice. A part of the core of the rope is eliminated so as to be able to reinsert the rope end into the sheath after the loop has been formed. There again attachment of the two pieces of rope is performed by stitching. Making a splice requires a manual operation which makes this technical solution hardly worthwhile and costly.

Finally, it is known to make a loop at the end of the rope by means of a strap. The strap has a width that is much larger than the diameter of the rope. The two ends of the strap are folded over onto one another to define a loop and the end of the rope is arranged between the two folds of the strap. Several lines of stitching are made to attach the two folds of the strap and the rope to each other.

The lines of stitching are made perpendicularly to the longitudinal axis of the rope and perpendicularly to the median plane passing through a diameter of the rope and corresponding to the interface between the two folds of the strap. Depending on the sectors, the thread used to stitch the seam passes only through the two folds of the strap, the two folds of the strap and the sheath or the two folds of the strap, two thicknesses of the sheath and the core. Depending on the position of the seam, a more or less large thickness of core is attached to the thread of the seam. This solution is relatively easy to implement, the cost of this operation remains well controlled but the general volume is fairly large which may be inconvenient in certain activities, in particular in tree care.

It is also apparent that the seam between the strap and the assembly formed by the sheath and the core is not homogeneous which is an incitation to increase the attachment surface occupied by the seams in order to obtain the required strength.

SUMMARY OF THE INVENTION

One object of the invention consists in remedying these shortcomings and more particularly in providing a rope that is easier to use than the ropes of the prior art as it has a more compactly integrated strap.

These shortcomings tend to be overcome by means of a rope that comprises:
  a core extending along a longitudinal axis;
  a sheath surrounding the core, the sheath extending along the longitudinal axis;
  a strap at least partially covering the sheath over a section perpendicular to the longitudinal axis, the strap being separated from the core by the sheath;
  at least one thread passing several times through the strap, the sheath and the core to form several links that secure the strap fixedly on the core and the sheath.

The rope is remarkable in that the links pass through a central section of the core, the central section corresponding to a circular section representing less than 50% of the cross-section of the core, and in that the links are angularly offset from one another when observed along the longitudinal axis.

According to one feature of the invention, the links extend along diameters of the assembly formed by the core and sheath.

In preferential manner, the links are contained in a plane that is perpendicular to the longitudinal axis.

Advantageously, two consecutive links are offset along the longitudinal axis.

In a preferential embodiment, the links extend over an angular sector at least equal to 180°. Preferentially, the links extend over an angular sector at least equal to 360°.

In an advantageous configuration, the strap is folded to form a loop, two folds of the strap being fixedly attached to the sheath.

It is also advantageous to provide a configuration in which the loop is fixed to one end of the sheath and extends along the longitudinal axis in the continuation of the sheath.

It is a further object of the invention to provide a method for manufacturing a rope that is easy to implement and that is efficient and enables a strap to be better integrated on a sheath.

This result tends to be achieved by means of a method for manufacturing a rope according to any one of the foregoing configurations comprising the following steps:
  providing a core and a sheath covering the core, the core and the sheath extending along a longitudinal axis;
  providing a strap;
  covering the sheath by the strap;
  securing the strap fixedly on the sheath and the core by means of at least one thread that passes several times through a central section of the core, the sheath and the strap, the central section corresponding to a circular section representing less than 50% of the cross-section of the core.

The method is remarkable in that the links are offset angularly from one another by rotation of the strap, of the core and the sheath around the longitudinal axis with respect to a needle that inserts the thread in the strap, sheath and core.

DESCRIPTION OF THE DRAWINGS

Other advantages and features will become more clearly apparent from the following description of particular embodiments and implementation modes of the invention given for non-restrictive example purposes only and represented in the accompanying drawings, in which:

FIGS. 3a and 3b schematically illustrate a longitudinal cross-sectional view and a top view of a rope terminated by a loop formed by a strap;

FIGS. 4a and 4b schematically illustrate a longitudinal cross-sectional view and a top view of another embodiment of the rope terminated by a loop formed by a strap;

FIG. 5 schematically illustrates a stitching step of a thread through the strap, the sheath and the core.

DETAILED DESCRIPTION

As illustrated in FIGS. 1, 2, 3a, 3b, 4a, 4b and 5, the rope 1 has a core 2 and a sheath 3 which both extend along a longitudinal axis A. The sheath 3 surrounds the core 2. The sheath 3 is in the form of a ring surrounding the core 2. The core 2 and the sheath 3 have a circular cross-section. What is meant by circular cross-section is a perfect or slightly deformed circle. The rope can be a dynamic rope, a semi-static rope or a static rope.

The core 2 has better mechanical performances than those of the sheath 3. The mechanical performances are studied along the longitudinal axis of the rope 1. The rope 1 is functionalised by means of a strap 4 that is fixedly secured on the sheath 3 of the 1. The strap 4 is separated from the core 2 by means of the sheath 3. The strap 4 is fitted irremovable from the core 2 and from the sheath 3.

Figure 1:
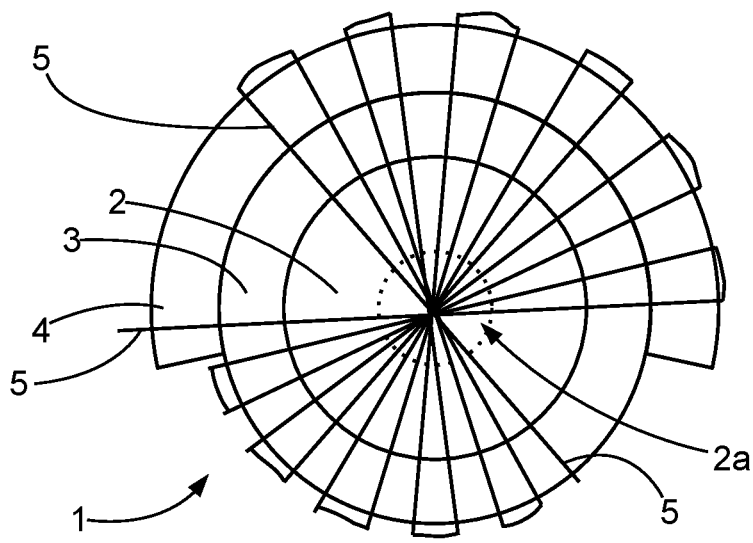
FIG. 1 schematically illustrates a cross-sectional view of a rope with a strap that partially covers the sheath.
Figure 2:
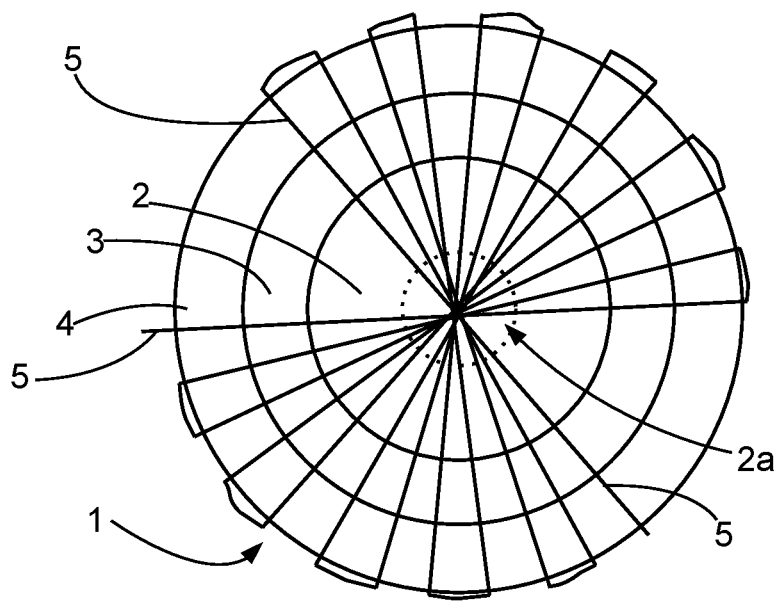
FIG. 2 schematically illustrates a cross-sectional view of a rope with a strap that almost completely covers the sheath.

In a particular configuration illustrated in FIG. 1, the strap 4 partially covers the outer wall of the sheath 3 in a cross-section perpendicular to the longitudinal axis of the rope 1. In another particular configuration illustrated in FIG. 2, the strap 4 covers the whole of the outer wall of the sheath 3 in a cross-section perpendicular to the longitudinal axis of the rope 1. In preferential manner, the strap 4 partially or totally covers the end of the sheath 3. The outer wall of the sheath 3 is in the form of a circle and the strap 4 is deformed to reproduce a circle or at least an arc of a circle.

The strap 4 is secured fixedly on the sheath 3 and on the core 2 by means of at least one the thread 5 that passes through the sheath 3, the core 2 and the strap 4 to form a seam. The at least one the thread 5 passes several times through the sheath 3, the core 2 and the strap 4 to attach the strap 4 fixedly on the sheath 3. The at least one the thread 5 forms a link that is a mechanical link between the strap 4 and the threads or filaments that form the core 2. the thread 5 enters and exits from the outer wall of the sheath several times to form several consecutive stitches.

The seam is formed radially or substantially radially to form a seam presenting better performances than the configurations of the prior art. The at least one the thread 5 extends along a diameter or substantially a diameter of the assembly formed by the core 2 and the sheath 3. the thread 5 passes through the strap 4 in continuation of the diameter. The strap 4 is pressed onto the outer surface of the sheath 3 to reproduce the curvature of the sheath 3.

When the thread 5 passes successively through the strap 4, a first thickness of the sheath 3, the core 2 and a second thickness of the sheath 3, it forms a mechanical link between all the layers it passes through. This passing of the thread 5 through the different layers forms the mechanical link between the strap on the one hand and the sheath 3 and the core 2 on the other hand. The core 2 is formed by a multitude of threads and/or of filaments. the thread 5 links up with the multiple threads and filaments that form the core 2.

the thread 5 passes through a central section of the core 2 to form a more efficient mechanical link. The central section corresponds to a circular section representing less than 50% of the cross-section of the core 2. The links are angularly offset from one another so as to press on a large surface of the sheath 3 and link up with a large quantity of threads or filaments that form the core 2.

To achieve a stronger mechanical link between the strap 4 and the core 2, it is preferable for the thread 5 making the link to pass through the largest possible distance of the core 2. In preferential manner, all the links between the strap 4 and the core 2 pass via the central section. In even more preferential manner, all the links between the strap 4 and the core 2 pass through a central section representing 30% of the section of the sheath or even a central section representing 15% of the section of the sheath, or they may even pass through the exact centre of the core 2. It is advantageous for most of the links or even all of the links formed by the thread 5 to be in the form of a diameter of the assembly formed by the sheath 3 and the core 2.

In order to have a maximum of links passing through amount thickness of the core 2, the links are offset angularly from one another so as to secure the strap 4 and the core 2 efficiently over the whole overlap area of the strap 4 on the sheath 3. For example, the angular offset between two consecutive links is comprised between 10° and 70°, preferentially between 20° and 70°, and even more preferentially between 30° and 70°. Advantageously, the successive links are offset by a constant angle. The angular offset is visible when the links are observed along the longitudinal axis A. The consecutive radial stitches extend over at least two arcs of a circle equal to 45°, preferably at least two arcs of a circle equal to 90° and even more preferentially at least two arcs of a circle equal to 180°.

In a particular embodiment illustrated in FIGS. 3a and 3b the different links that secure the strap 4 fixedly with the core 2 all belong to one and the same plane that is perpendicular to longitudinal axis A of the sheath 3 and of the core 2. In preferential manner, the angular offset is constant between the consecutive links. FIG. 3a illustrates a cross-sectional view with the links that are all in the same plane. FIG. 3b illustrates a side view in which the stitches of the thread 5 that move on the perimeter can be observed. With two arcs of a circle equal to 180°, the links extend over an angular sector equal to 360°.

In another particular embodiment illustrated in FIGS. 4a and 4b the different links that secure the strap 4 fixedly with the core 2 are offset angularly from one another and the seam moves along longitudinal axis A of the sheath 3 and of the core 2. The seam represents an arrangement in the form of a spiral/helical. In preferential manner, the angular offset is constant between the consecutive links and the offset along longitudinal axis A is also constant. The attachment area between sheath 2 and the strap 4 is more extensive along longitudinal axis A than in the previous configuration. FIG. 4a illustrates a cross-sectional view with the links that are offset in different planes. FIG. 4b illustrates a side view in which the stitches of the thread 5 can be seen to be offset to achieve an angular offset and also an offset along the longitudinal axis A. When the consecutive links are offset angularly and along the longitudinal axis A, it is advantageous for the arc of a circle formed by the sharp end of the needle to represent at least 180° or even 360°. When the arc of circle represents at least 360°, at least one turn is formed. For example, a plurality of turns is formed.

It is possible to modulate the offset distance between two consecutive stitches along the longitudinal axis and even to modulate the direction of travel between the stitches.

It is possible to combine these two embodiments with an attachment area having one end formed by a first series of links belonging to a first plane perpendicular to the longitudinal axis of the sheath 3 and of the core 2. The first series of links is followed by a second series of links having links that are angularly offset and offset along longitudinal axis A. The second series of links can be followed by a third series of links comprising links belonging to a second plane perpendicular to the longitudinal axis of the sheath 3 and of the core 2. The first plane is separated from the second plane by the second series of links.

In preferential manner, the width of the strap 4 is smaller than or equal to the perimeter of the sheath 3 (2.π.R, with R the outer radius of the sheath 3). When the width of the sheath 3 is larger than the perimeter of the sheath 3, it is advantageous for several thicknesses of the strap 4 to be deposited on the sheath 3 to reproduce the shape of the outer wall of the sheath 3 as faithfully as possible.

It is preferable for the width of the strap 4 to be larger than or equal to 30% of the perimeter of the sheath 3. It is particularly advantageous for the width of the strap 4 to be less than or equal to 97% of the perimeter of the sheath 3 so as not to have to handle an overlap of two thicknesses of the strap 4.

In a preferential embodiment, the strap 4 is folded so as to define a loop 4a. The strap 4 has two folds facing one another. The sheath 3 and the core 2 of the rope 1 are arranged between the two folds. The two folds of the strap 4 cover the sheath 3 and are secured by the at least one the thread 5 which forms the multiple links. the thread 5 passes through the first fold, a first thickness of the sheath 3, the core 2 passing via the central section, a second thickness of the sheath 3 and the second fold to form first links. Second links are made by the at least one the thread 5 that passes through following the opposite path, i.e. the second fold, a first thickness of the sheath 3, the core 2 passing via the central section, a second thickness of the sheath 3 and the first fold. In the embodiment illustrated in FIGS. 3a-4b, loop 4a is arranged in the extension of the core 2 and the sheath 3 along longitudinal axis A. As an alternative, the loop is formed by the strap 4 without having to form the two folds fixed to the sheath 3.

Preferentially, when the strap 4 has two folds that cover the sheath 3, the two folds cover at least 75% of the outer perimeter of the sheath 3 and advantageously form 100% of the outer perimeter of the sheath 3 or slightly less than 100% of the perimeter.

In a particular embodiment, the sheath 3 is provided with an area of increased friction near the overlap area of the sheath 3 by the strap 4. The area of increased friction enables the rotation of the sheath 3 and of the core 2 to be better controlled when the links are formed with a sewing machine. A sleeve can be fixed onto the sheath 3. The sleeve is textured with salient areas that enable the rotation of the core 2 and of the sheath 3 around longitudinal axis A to be controlled thereby better controlling the angular offset between the links.

When stitching is performed, the strap 4, the sheath 3 and the core 2 rotate at the same speed around the longitudinal axis of the core 2. The needle passes through the core 2 and the sheath 3 passing via the central section, preferably passing through the centre of the core to be connected to the core over the largest available distance.

When the links are formed by means of the sewing machine, the needle attacks the sheath 3 radially. Adjustment of the sewing machine is easier to perform. The use of a radial seam that passes systematically through the central area of the core 2 enables the breakage rate of needles during the stitching operations to be reduced.

FIG. 5 illustrates the use of a needle 6 inserted in the strap 4, in the sheath 3 and in the core 2 to form the links by means of the thread 5.

The invention claimed is:

1. Rope comprising:
   a core extending along a longitudinal axis;
   a sheath surrounding the core, the sheath extending along the longitudinal axis;
   a strap at least partially covering the sheath over a section perpendicular to the longitudinal axis, the strap being separated from the core by the sheath;
   a seam formed by means of at least one thread passing several times through the strap, sheath and core to form several links to attach the strap fixedly on the core and on the sheath;
   wherein the links pass through a central section of the core, the central section corresponding to a circular section representing less than 50% of the cross-section of the core and wherein the links are angularly offset from one another when observed along the longitudinal axis.

2. Rope according to claim 1 wherein the successive links extend along diameters of the assembly formed by the core and sheath.

3. Rope according to claim 1 wherein the links are contained in a plane that is perpendicular to the longitudinal axis.

4. Rope according to claim 1 wherein two consecutive links are offset along the longitudinal axis.

5. Rope according to claim 3 wherein the successive links extend over an angular sector at least equal to 180°.

6. Rope according to claim 5 wherein the successive links extend over an angular sector at least equal to 360°.

7. Rope according to claim 4 wherein the successive links extend over an angular sector at least equal to 180°.

8. Rope according to claim 1 wherein the strap is folded to form a loop, two folds of the strap being fixedly attached to the sheath.

9. Rope according to claim 8 wherein the loop is fixed to one end of the sheath and extends along the longitudinal axis in the continuation of the sheath.

10. Method for manufacturing a rope comprising the following steps:
    providing a core and a sheath covering the core, the core and sheath extending along a longitudinal axis;
    providing a strap;
    covering the sheath by the strap;
    securing the strap fixedly on the sheath and on the core by means of at least one thread that passes several times through a central section of the core, sheath and strap, the central section corresponding to a circular section representing less than 50% of the cross-section of the core, and the links are offset angularly from one another by a rotation of the strap, core and sheath around the longitudinal axis with respect to a needle that inserts the thread in the strap, sheath and core.

\* \* \* \* \*